Nov. 23, 1965 R. E. CARTER ETAL 3,219,158
QUICK ATTACH PANEL FASTENER
Filed March 30, 1964 3 Sheets-Sheet 1
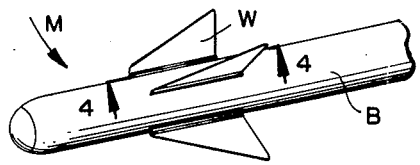
FIG. 1.
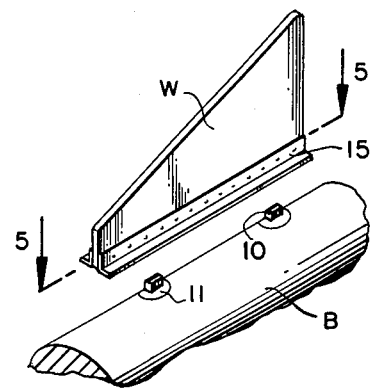
FIG. 2.
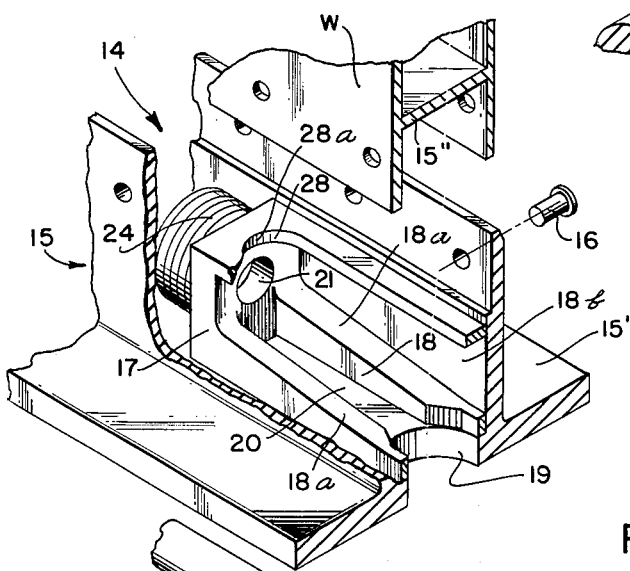
FIG. 3.
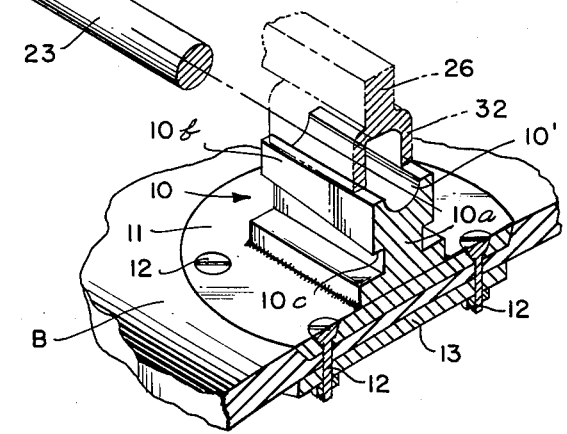
INVENTORS.
RALPH E. CARTER
GEORGE E. MYERS
BY
*P.H. Firsht*
ATTORNEY.

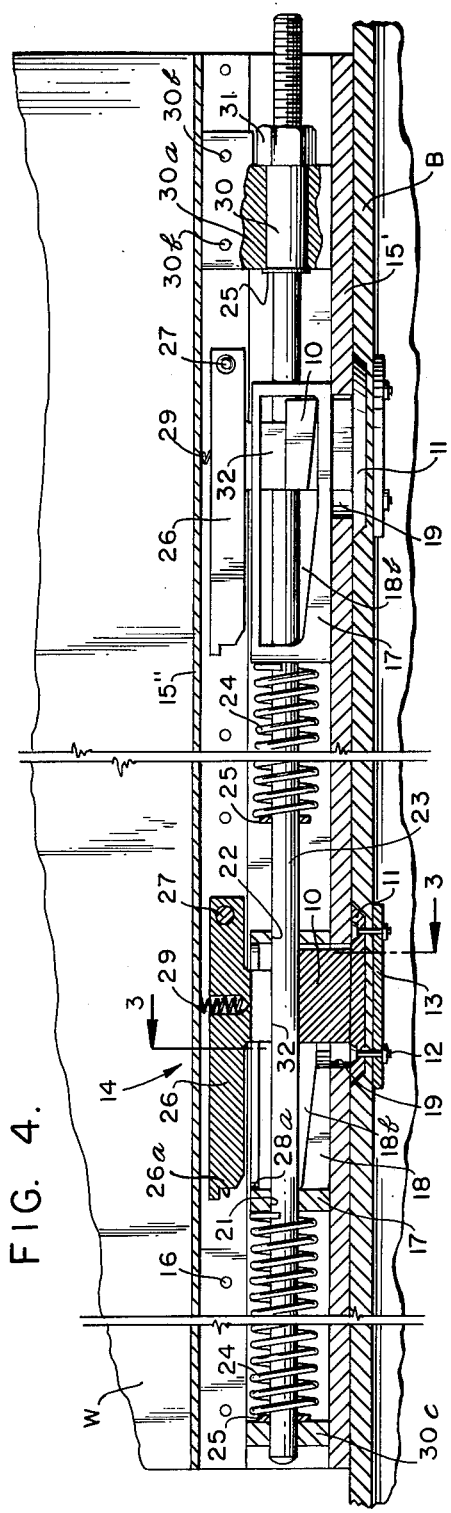

INVENTORS.
RALPH E. CARTER
GEORGE E. MYERS
BY
*P. H. Fircht*
ATTORNEY.

United States Patent Office 3,219,158
Patented Nov. 23, 1965

3,219,158
QUICK ATTACH PANEL FASTENER
Ralph E. Carter and George E. Myers, China Lake, Calif., assignors to the United States of America as represented by the Secretary of the Navy
Filed Mar. 30, 1964, Ser. No. 355,975
7 Claims. (Cl. 189—36)
(Granted under Title 35, U.S. Code (1952), sec. 266)

The invention described herein may be manufactured and used by or for the Government of the United States of America for governmental purposes without the payment of any royalties thereon or therefor.

The present invention relates to a structural member coupling device, and more particularly to a device which serves as a "quick-attach" fastener for joining cantilevered aerodynamic wing panels with aerodynamic bodies, airborne vehicles, and missiles of the air-launched variety.

In the transportation, storage, and assembly of many aircraft armaments, of the types commonly referred to as air-launched missiles, it has been a common practice to attach the missile wings with the missile bodies at the point the missiles are mated with a launching aircraft. Oftentimes the missiles wings and bodies are coupled or fastened together after the missile body has been secured to the aircraft.

Heretofore, various techniques have been employed to fasten the wings of a missile to its body. Conventional techniques normally make use of pins, screws, and wedging devices for positioning and securing the wings in desired dispositions relative to the missile's body. However, where speed and accuracy in missile assembly are of prime concern, the known techniques have not been found to be entirely satisfactory, as they involve operations requiring expenditures of relatively large quantities of time and labor.

Therefore, it is the purpose of the instant invention to provide a reliable and economic mechanism, which accommodates an expeditious assembly of aircraft armaments of the hereinbefore described type, without sacrificing missile strength and operational capabilities.

An object of the instant invention is to provide a quick-attach mechanism for expeditiously joining structural members.

Another object is to provide a spring-loaded device which affords an expeditious coupling of aerodynamic wing panel members with aerodynamic bodies.

Still another object is to provide an operative structural member coupling means, which is spring-loaded to accommodate a presetting, whereby a structral member joining operation may be initiated in response to a positioning of a plurality of structural members in a coupling disposition.

A further object is to provide a quick-attach coupling device for cantilevered wing panels of aerodynamic bodies and airborne vehicles.

Yet a further object is to provide a spring-loaded means which accommodate an expeditious assembly of aircraft-mated, air-launched aircraft armaments.

Still a further object is to provide a spring-loaded cantilevered wing coupling mechanism mounted within an aerodynamic wing panel, whereby the wing panel may be attached to a missile body in response to a positioning of the wing adjacent the body in an operative coupling disposition.

Other objects, advantages and novel features of the invention will become apparent from the following detailed description of the invention when considered in conjunction with the accompanying drawings wherein:

FIG. 1 is a partial perspective view of an air-launched vehicle, or missile, having aerodynamic wing panels coupled thereto through the coupling system of the instant invention;

FIG. 2 is a fragmentary, partially exploded, perspective view, on an enlarged scale, of one of the wing panels of FIG. 1, illustrating relative disposition for a pair of body-mounted coupling studs;

FIG. 3 is a partially exploded, fragmentary, perspective view, on an enlarged scale, taken generally along lines 3—3 of FIG. 4, illustrating a coupling stud and latching block arrangement;

FIG. 4 is an enlarged partial side elevational view of a wing panel, taken generally along lines 4—4 of FIG. 1, illustrating a preset disposition for the latching blocks and coupling studs after the latching block is released but before the latching block is displaced;

FIG. 5 is a plan view of the wing butt portion of a wing panel taken generally along lines 5—5 of FIG. 2, illustrating a preset disposition for the latching blocks.

Figure 6B:
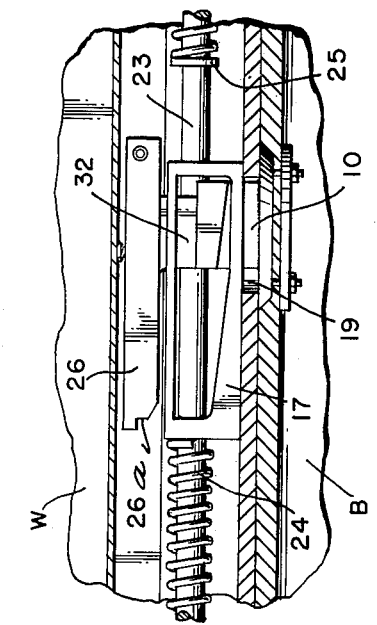
FIGS. 6A–6D comprise fragmentary views illustrating alternate positions assumed by the latching blocks and coupling studs as the wing panel is coupled with and released from the vehicle of FIG. 1.

Referring now to the drawings, wherein like reference characters designate like or corresponding parts throughout the several views, there is shown in FIG. 1 a foreward portion of an airborne missile, generally designated M, which may be of the type normally referred to as an air-launched missile and normally utilized as aircraft armament. Mounted at preselected areas along the outer surfaces of the missile's body B, is a plurality of cantilevered aerodynamic wing panels or members W. As each wing W may be mounted in a similar manner utilizing a similar coupling device, or coupling assembly, a description of a single one of the devices is deemed sufficient to provide an understanding of the present invention.

Turning now to FIG. 2, each wing W is attached to the surface of the missile's body through a plurality of body-mounted coupling studs 10. Each of the studs 10 is joined to the body B by means of a mounting plate 11 secured to the body by conventional means, such as, for example, screws 12, FIG. 3, extending into the body B to be anchored in an airframe stringer member or conventional anchor plate 13.

Each stud is provided with a dished-out upper surface 10′, FIG. 3, the purpose of which will hereinafter become more clearly understood, a vertical center portion 10a, fastened to the plate 11 by welding or other suitable means, and a pair of laterally extending latching or coupling abutments 10b. Each abutment 10b extends outwardly at right angles to the vertical center portion 10a, and has formed at its lowermost portion a flat, laterally extending coupling or latching surfaces 10c. The abutments 10b are so tapered that the surfaces 10c slope upwardly for imparting a wedge-shaped configuration thereto so that they may function as a wedge for drawing a wing butt of an associated wing panel W downwardly into a "snug" fit against the body B as the wing is attached or coupled to the body through the use of the studs.

In order for a wing-butt of a wing panel W to be joined through the coupling studs, it is necessary to provide each wing-butt with a latching block assembly, generally designated 14. The assembly 14 is disposed in a rectangular, elongated housing 15, FIG. 2, which may extend the full width, or length, of a wing-butt as it engages the surface of the body B. The housing 15 is attached to a given wing panel by any suitable means, such as rivets 16, for example, and is provided with a laterally extending surface member 15′, which serves as the portion of the wing-butt adapted for engaging an exterior surface of missile body B. Within the housing 15 there is slidably arranged a plurality of latching blocks 17. As all of the latching blocks 17 are of similar design and construction and function in a similar manner, a description of a single one of the blocks is deemed sufficient to provide an understanding of the instant invention.

Each latching block 17 comprises an elongated hollow rectangular member of a dimension permitting it to be slidingly received and guided by the interior surfaces of the housing 15 in a manner such that the latching block may be slidingly displaced, or reciprocated, within the housing 15 along the housing's longitudinal axis. Each latching block 17 is provided with a pair of wedge-shaped abutments 18 so arranged within the latching block as to be disposed at opposite sides of the interior portions thereof and in a displaced relationship with respect to each other and in a manner to receive therebetween the vertical center portion 10a of an adjacent coupling stud 10. Each abutment 18 is provided with an upwardly tapered uppermost surface 18a for frictionally engaging the surfaces 10c of a coupling stud 10 to effect a coupling between the latching blocks 17 and coupling studs 10.

When a coupling is effected, the surfaces 18a and 10c are disposed in a face-to-face relationship so that the abutments 10b and 18 function as interlocking members for precluding normal or outward displacement of a wing W from a missile's body B. Further, it is to be particularly noted that once the surfaces 10c and 18a are disposed in a face-to-face relationship, for effecting a coupling between the latching blocks and coupling studs, relative displacement therebetween is limited to a single direction, viz, a direction which permits a sliding withdrawal, or disengagement, of the surfaces of the wedge-shaped abutments 10b and 18.

The abutments 18, and surfaces 18a, are formed through any suitable fabricating techniques, however, it has been found practical to cut or machine relief slots 18b through the normally vertical side walls of the latching blocks 17 for thus affording access to the interior thereof so that a machining of the surfaces 18a may be effected. Each of the latching blocks 17 is so arranged within the housing 15 as to be disposed adjacent a stud-receiving opening 19 formed in the flat-surfaced member 15' of the housing 15. The openings 19 are arranged in an in-line alignment and as are so longitudinally spaced as to be aligned with the studs 10 when the wing W and missile M are associated for purposes of assembly.

In order to effect a coupling of the latching blocks 17 and the studs 10, it is necessary for the studs to be first inserted and seated within the latching blocks 17, and for the vertical center portion 10a of the stud 10 to be positioned between the abutments 18. Hence, the lowermost wall or portion of each latching block 17 is relieved so as to provide each latching black with an opening 20. Each opening 20 is dimensioned so as to afford an insertion of a stud 10 within a portion of the latching block 17 and to then accommodate a longitudinal, sliding displacement of the latching block for thus establishing a wedging engagement between the abutments of the latching block and seated stud. Therefore, it is to be understood that when a stud 10 is inserted through an opening 19, to assume a seated disposition within a latching block 17, the abutments 10b and 18 are so aligned and their tapers so directed as to permit the latching block 17 to be slidingly displaced, in a longitudinal direction, to establish a frictional face-to-face engagement between their respective surfaces 10c and 18a to thus effect an interlock between the abutments 10b and 18, and consequently, to effect a coupling between an associated wing panel W and missile body B.

Each of the latching blocks 17 is provided with a pair of tension rod receiving openings 21 and 22, FIG. 4, which accommodate a longitudinal passage of an elongated tension rod 23 therethrough. The rod 23 is common to and passes through all of the latching blocks 17 of a given assembly 14. Each of the latching blocks 17 is slidingly mounted on the rod 23 in a spaced relationship with respect to each other and are connected to the rod by the openings 21 and 22. Mounted concentrically with the rod 23, and adjacent each latching block 17, there is arranged a coil-type compression spring 24. Each of the springs 24 are so disposed as to have a first end thereof fixed relative to the rod 23 by means of a conventional retainer 25, and a second end thereof disposed in sliding relationship with respect to the rod and in an abutting relationship with a selected one of the latching blocks 17. The springs 24 are each disposed so as to apply a continuous force against the associated latching block 17 for slidingly displacing the latching block along the rod 23 in a longitudinal direction for effecting the aforementioned face-to-face engagement of the surfaces 10c and 18a.

As it is intended that the springs 24 provide the necessary forces for effecting a coupling of the latching blocks 17 with the coupling studs 10, it is deemed desirable to provide means for establishing and maintaining a state of compression for the springs to thus effect a preset condition whereby the assembly may be conditioned to first receive the studs 10 and, subsequently, effect an automatic coupling of the latching blocks 17 with the studs 10. As a practical matter, it is necessary to utilize a significant quantity of force in order to insure the establishment of a proper face-to-face engagement of the surfaces 10c and 18a. Therefore, each of the springs 24 must be maintained in a compressed state while the latching blocks 17 are retained in a coupling stud receiving disposition. This is accomplished through the use of a plurality of elongated stop members 26. Each of the stop members 26 is pivotally supported above a given latching block 17 by a pivot pin 27 passing horizontally through a first end of the stop member 26 and secured to the housing 15 in a manner such that the member's second end may pivot or drop into engagement with the latching block 17 to cause it to be fixed against spring-imposed displacement. If desired the second end of each stop member 26 may be provided with a stop surface 26a, FIG. 4, having a lip and shoulder configuration, which accommodates a seating of the stop member 26 adjacent a stop shoulder 28a formed about an elongated opening 28 provided at the uppermost surface of each latching block 17.

As a practical matter, it has been found desirable to utilize a vertically disposed compression spring 29 having a first end thereof seated within the uppermost surface of the stop member 26 and abutting against an uppermost housing member 15" of housing 15 so that a downwardly directed resilient force may be applied to the stop member 26 for insuring a seating of the stop surface 26a relative to stop shoulder 28a.

When the stop surfaces 26a, of the members 26, are seated adjacent the stop shoulders 28a of the latching blocks 17, the plurality of springs 24 may be compressed in a simultaneous fashion by displacing the rod 23 along its longitudinal axis in a direction which serves to draw the springs 24 toward the adjacent latching blocks, which are now retained in a fixed relationship relative to the housing 15 by a given one of the stop members 26. To provide means for displacing the rod 23, a bearing block 30, FIGS. 4 and 5, is fixed at one end of the housing 15, through a suitable retaining block 30a fixed to the housing 15 by pins 30b. The block 30 surrounds an end portion of the rod 23 with a given length thereof extending outwardly therethrough. The outermost end portion of the rod 23 threaded to receive a tension nut 31, which, when torqued, serves to displace the rod 23 relative to the bearing block 30. For obviating rotational displacement of the rod 23, as the nut 31 is torqued, a rectangular anti-rotation nut 30c may be fixed to the rod 23, by any suitable means, not shown, to bear against the interior surfaces of the housing 15, in a manner such as to preclude a rotation thereof. Hence, it is to be understood that the springs 24 may be simultaneously compressed to a preset condition merely by applying torque to the tension nut 31 for displacing the rod 23 in a longitudinal direction for compressing the springs 24 between the retained latching blocks 17 and the retainers 25.

Once the springs 24 are compressed, the latching blocks 17 and the nut 31 serves to maintain the springs 24 in a compressed state. In order to release the latching blocks, so that the compressed springs 24 may function to force the latching blocks along the rod 23 toward associated studs 10, for thus effecting a coupling therebetween, an inverted U-shaped release means, or trigger block 32 is provided as an integral component of the elongated stop member 26. Each block 32 is routed or so formed and arranged as to extend downwardly at opposite sides of the rod 23 to be engaged by the uppermost surfaces of an abutment 10b as the stud is inserted through the openings 19 and 20, FIG. 4. It is to be understood that the amount of downward extension of the block 32 depends largely upon the extent of upward displacement to be imparted to the stop member 26 and the depth of the disked-out portion 10' of a stud 10 in which the rod 23 is received during the coupling operation. When the uppermost surfaces of the stud 10 engage the lowermost surfaces of the block 32, the stop member 26 is forced upwardly, acting against the spring 29, FIG. 4, so that the surface 26a is forced out of engagement with the surface of the stop shoulder 28a. This will occur at the moment the stud 10 is seated or so positioned as to establish an operative alignment for the surfaces 10c and 18a of the abutments 10b and 18. At the instant the surface 26a is forced out of engagement with th surface of the stop shoulder 28a, the latching block 17 is released so that spring 24 may now act to slidingly force the latching block 17 toward the stud 10 to effect a coupling therebetween.

Figure 6D:
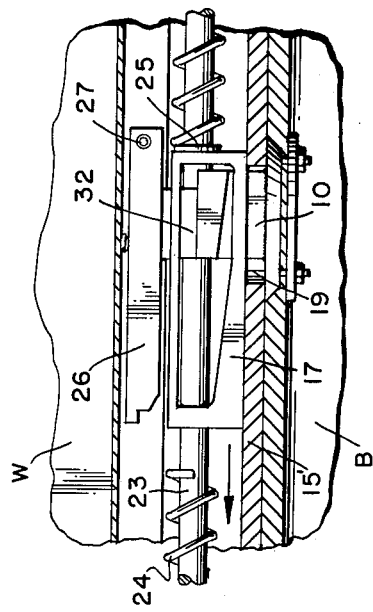
Figure 6A:
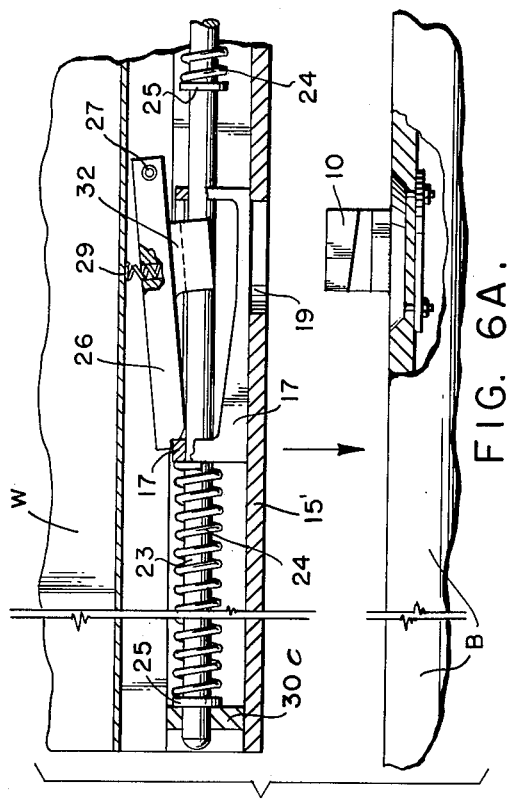

In operation, the latching block assembly 14 may be first preset to a condition, FIG. 6A, wherein the latching blocks 17, of the latching block assembly 14, are so positioned at a point within the assembly housing 15 that the openings 20 of the latching blocks 17 are aligned with the openings 19 of the housing 15 and the surface 26a, of each of the stop members 26, is forced into engagement with a latching block stop shoulder 28a for/maintaining each of the blocks 17 in a longitudinally fixed relationship with respect to the housing 15 against recovery forces of compressed springs 24. The springs 24 are compressed through displacing the rod 23 by applying torque to nut 31, whereupon the retainers 25 serve to force the springs 24 against adjacent and fixed latching blocks 17 for thus causing the springs 24 to undergo compression.

Figure 6C:
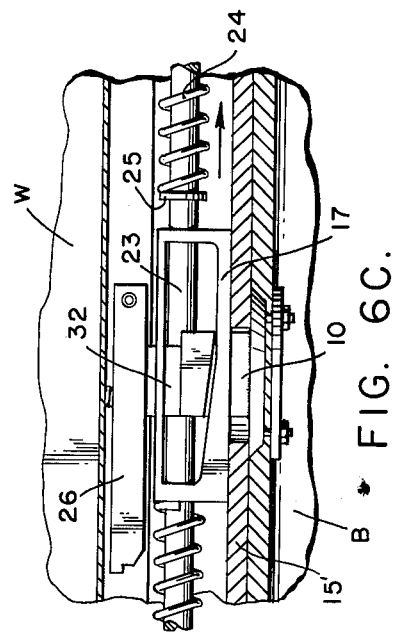

The wing or structural panel W is next positioned relative to the missile body B, FIG. 6B, in a manner such that the aligned studs 18, fixed to the missile body B, are received within the aligned openings 19 and 20. The wing panel W now is forced into a seated and abutting relationship with respect to the body B of the missile, whereupon the uppermost surfaces of the studs 10 engage the lowermost surfaces of the trigger blocks 32 for thereby forcing the stop members 26 upwardly to disengage the surfaces 26a from the stop shoulders 28a as the studs 10 are caused to be seated within the housing 15. When the coupling studs 10 are seated, the surfaces 10c of the abutments 10b are aligned relative to the surfaces 18a of the latching block abutments 18, whereby as the surfaces 26a of the stop members 26 are disengaged from the stop shoulders 28a, the compressed springs 24 recover and drive the latching blocks 17 toward associated coupling studs 10 so that the surfaces 10c and 18a are disposed in a frictional face-to-face coupling engagement. As the surfaces of the tapered abutments 10b and 18 are slid into face-to-face engagement, the tapered wedge-shaped configurations of the abutments serve to draw the wing butt of the wing panel W into a "snug" relationship against the body B, FIG. 6C, to thus cause the wing butt to be properly seated and secured against the surface of the body B.

Residual spring forces and sliding friction resist the various forces which normally tend to loosen or uncouple the abutments, however, the latching blocks 17 may be retracted for releasing the wing panel W from the body B, or for initially positioning the latching blocks 17 during an establishment of a preset condition for the assembly 14, merely by loosening the nut 31 in a manner such that the tension rod 23 may be manually forced through the block 30 in a direction for relieving the residual spring forces and accommodating a forcing of the retainers 25 against those adjacent latching blocks 17 which are aligned adjacent the retainers and are oppositely disposed from the associated springs 24 to thus impart a retracting displacement to the latching blocks 17, FIG. 6D. It is to be particularly noted that no spring 24 is disposed between the block 30a and the adjacent latching block 17, however, a retainer 25, or other suitable means, FIG. 4, is normally secured to the tension rod 23 and is utilized as a limiting stop for the rod 23 as the rod is displaced in a spring compressing direction, and serves as a means for applying retracting forces to the adjacent latching block 17 when the rod 23 is forceably displaced in a reverse direction during a wing detaching or uncoupling operation.

In view of the foregoing description, it is to be understood that the present invention provides a simplified structural member coupling means which accommodates an expeditious coupling of aerodynamic wing panels with aerodynamic bodies. It is to be further understood that the hereinbefore described coupling means may be adapted for joining structural members of various types, such as, for example, pre-fabricated construction panels and beams.

Obviously many modifications and variations of the present invention are possible in the light of the above teachings. It is therefore to be understood that within the scope of the appended claims the invention may be practiced otherwise than as specifically described.

What is claimed is:

1. A structural member coupling means comprising, in combination:

a coupling stud mounting surface connected with a first structural member;

a plurality of coupling studs, each being provided with a plurality of laterally extending latching abutments;

means mounting each of said studs on said mounting surface in an in-line displaced relationship with respect to each other whereby the latching abutments thereof are disposed in an operative in-line disposition;

a latching block assembly including an elongated housing having a plurality of stud receiving openings therein;

a plurality of latching blocks, each being arranged within said housing adjacent one of said openings and having a plurality of latching abutments fixed thereto;

means slidingly mounting each of the latching blocks within said housing in an in-line displaced relationship with respect to each other and in a manner such that the latching abutments of said latching blocks are disposed in an off-set disposition and an in-line alignment relative to said latching abutments of said studs when said studs are inserted and seated within said housing;

a tension rod slidably mounted within said housing extending in a longitudinal direction through said elongated housing and being slidingly associated with each of said latching blocks in a manner such that the latching blocks may be slidingly displaced in a longitudinal direction with respect to said housing and along the surface of said rod;

a plurality of compression springs, each being concentrically mounted about said tension rod so as to abut an adjacent one of said latching blocks;

a plurality of spring retaining means fixedly secured to said tension rod in a manner such that each retaining means retains one end of a given one of the compression springs of said plurality of springs in a longitudinally fixed relationship with respect to said rod, with the other end thereof being free of said rod and forced into an abutting relationship with a given one of said latching blocks under the influence of spring recovery forces;

tensioning means for displacing said tension rod in a longitudinal direction through said housing in a manner such that the fixed end of each of said springs is displaced in a direction extending toward the latching block abutting end thereof;

a plurality of elongated latching block stop members mounted in a manner such that each stop member is pivotally supported at a first end thereof by said housing adjacent a given one of said latching blocks and adapted to be pivotally displaced so that a second end thereof may be displaced into an abutting relationship with stop surfaces of said latching blocks for maintaining the blocks in a fixed relationship with respect to said housing to oppose displacement of said latching blocks as the fixed ends of said springs are simultaneously displaced through a displacement of said tension rod;

a plurality of resilient depressing means being individually adapted to force each of said stop members into an abuting relationship with each of the latching block stop surfaces;

a plurality of stop member release means each being fixed to a given one of the latch members and adapted to be engaged by an associated coupling stud, so that when said blocks and studs are displaced toward each other into an associated and aligned coupling relationship, said stop members are engaged by said studs and displaced out of abutting relationship with the latching block stop surfaces so that said springs may forceably displace said latching blocks along said tension rod and said housing for forcing the latching abutments of said coupling studs and latching blocks into an interlocking relationship; and means mounting said latching block assembly on a second structural member, whereby said first and second structural member may be coupled through the interlocking of said abutments.

2. In a device for joining an aerodynamic wing panel with an aerodynamic body having protruding locking abutments displaced along its surface and extendable into said wing panel in an in-line alignment means comprising:

a plurality of operatively associated latching blocks disposed in displaced relationship with respect to each other and in an in-line alignment with the locking abutments;

means defining at least one locking abutment fixed to each of said latching blocks;

confining means having a flat bearing surface for confining and maintaining a plurality of said latching blocks within said wing panel in a manner such that the latching blocks may be slidingly displaced along said bearing surface for displacing the locking abutmeans fixed thereto relative to the wing panel; and resilient means normally biasing each of said latching blocks in a given direction for causing said latching blocks to undergo displacement along said bearing surface toward the locking abutments fixed to said body, whereby the abutments fixed to the body and to the latching blocks may be engaged for establishing an interlocking relationship therebetween.

3. A device for coupling structural members, comprising in combination:

a plurality of coupling studs, each having at least one locking abutment extending therefrom;

means mounting said studs in spaced relationship along a surface of a first structural member;

a latching block assembly including a plurality of spaced latching blocks, each having at least one coupling stud engaging surface for frictionally engaging and interlocking with a locking abutment of a given coupling stud;

a plurality of compression springs each being mounted adjacent a given one of the latching blocks;

means for simultaneously imposing a state of compression on said springs;

a plurality of retaining means, each being adapted to maintain a given latching block against displacement and retain a given one of said springs in a compressed state;

release means individually connected with the retaining means and being adapted to be actuated by said coupling studs for releasing a given latching block from its fixed condition and thereby relieving the imposed state of compression from said springs, whereby each of said springs may function to force the coupling stud engaging surface of a given one of the latching blocks into a frictional interlocking disposition with respect to the locking abutments of a given one of the coupling studs; and means for mounting said latching block assembly on a surface of a second structural member, whereby the structural members may be coupled through a positioning thereof into a disposition such that the studs mounted on the first structural member engage the release means of the latching block assembly mounted on the second structural member.

4. In a wing coupling device for joining cantilevered wing panels with air-launched aircraft armament, means including:

an elongated latching block assembly housing having a plurality of coupling stud receiving openings formed therein for operatively receiving a plurality of coupling studs;

a plurality of slidably displaceable latching blocks, each being disposed adjacent a given one of said openings and having at least one latching surface for interlocking with a given one of the coupling studs operatively received in said housing;

a plurality of resilient biasing means, each being arranged within said housing adjacent a given latching block in a manner such that each resilient biasing means continuously applies a sliding force to an adjacent latching block in a direction for slidably displacing the given latching block toward an adjacent operatively received coupling stud, whereby the latching block's latching surface may be slidably displaced into an interlocking engagement with an adjacent coupling stud;

a plurality of pivotally mounted releasable latching block stop means, each being adapted to engage a single one of said latching blocks and normally maintain said block in an inoperative displaced disposition relative to an adjacent coupling stud receiving opening;

compressing means for simultaneously compressing and normally maintaining a state of compression for each of said resilient means as it caused to continuously apply a displacing force to an adjacent latching block normally maintained in a displaced disposition relative to an adjacent coupling stud receiving opening; and a plurality of release means, each being separately connected with a single of said latching block stop means and disposed in a disposition to be operatively engaged and realeased by a coupling stud as it is received within a coupling stud receiving opening, whereby, as each of the release means is engaged, the latching block stop means for each latching block is released so that each of said resilient means may function to slidably displace an adjacent block toward an adjacent coupling stud for forceably effecting an interlocking relationship between the latching block's latching surface and an adjacent coupling stud.

5. The coupling device of claim 4, wherein said compressing means includes:
an elongated bar;
means slidably connecting each of said latching blocks with said bar;
means fixed to said housing and to said bar for selectively displacing the bar in a given direction along its longitudinal axis;
a plurality of resilient means connecting members interconnecting said bar with said resilient means for simultaneously compressing each of said resilient means as said bar is selectively displaced; and
means for maintaining said bar in a selectively displaced disposition.

6. The device as defined in claim 5, further characterized in that each of said resilient means comprises:
a coiled compression spring concentrically mounted about said bar, having a first end thereof fixed to said bar by one of said resilient means connecting members and having a second end thereof disposed in an abutting relationship with an adjacent latching block in a manner such that the spring is retained between said one of said resilient means connecting members and said adjacent latching block.

7. In a wing coupling system for attaching an aerodynamic wing panel to an air-launched aircraft armament missile, means comprising:
an elongated coupling assembly retaining housing mounted along one edge of said wing panel;
an elongated tension rod disposed along the longitudinal axis of said housing and being slidingly connected at one end thereto, whereby said rod may be slidingly displaced in a longitudinal direction with respect to said housing;
a plurality of latching blocks slidingly connected to said rod and arranged in a longitudinally displaced in-line relationship with respect to each other;
a plurality of compressible springs, each being mounted concentrically about said rod in displaced relationship with respect to each other and having a first end thereof fixedly connected with said rod and a second end thereof free from said rod and abutting one of said blocks and being adapted to continuously apply displacing forces to said one of said latching blocks for slidingly displacing the block along said rod in a longitudinal direction;
a plurality of retaining means for releasably retaining each of said blocks in a fixed relationship with respect to said housing and acting against said displacing forces imposed through said springs;
means for longitudinally displacing said rod in a given direction for simultaneously compressing each of said springs when each of said latching blocks is retained by said retaining means and maintained in fixed relationship with respect to said housing; and
releasing means for displacing each of said retaining means relative to said latching blocks so that each of said latching blocks may be operatively displaced relative to said rod and said housing under the influence of said displacing forces to effect a wing panel coupling displacement of said latching blocks.

No references cited.

FRANK L. ABBOTT, *Primary Examiner.*